(12) United States Patent
Hsu et al.

(10) Patent No.: US 11,170,648 B2
(45) Date of Patent: Nov. 9, 2021

(54) VEHICLE INFORMATION DISTRIBUTING METHOD AND SYSTEM

(71) Applicant: INDUSTRIAL TECHNOLOGY RESEARCH INSTITUTE, Hsinchu (TW)

(72) Inventors: Kuo-Huang Hsu, Hsinchu (TW); Tzu-Hsiang Su, Hsinchu (TW); Yu-Che Wang, Hsinchu (TW); Yu-Dai Yan, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 139 days.

(21) Appl. No.: 16/379,892

(22) Filed: Apr. 10, 2019

(65) Prior Publication Data

US 2020/0226928 A1   Jul. 16, 2020

(30) Foreign Application Priority Data

Jan. 15, 2019   (TW) .................................. 108101565

(51) Int. Cl.
*G08G 1/16* (2006.01)
*G07C 5/00* (2006.01)
*H04W 4/40* (2018.01)

(52) U.S. Cl.
CPC ............. *G08G 1/163* (2013.01); *G07C 5/008* (2013.01); *G08G 1/166* (2013.01); *H04W 4/40* (2018.02)

(58) Field of Classification Search
CPC .................................................... G08G 1/163
See application file for complete search history.

(56) References Cited

U.S. PATENT DOCUMENTS

2012/0320873 A1\* 12/2012 Zhou ..................... H04W 16/02
370/331
2016/0212675 A1\* 7/2016 Choi ....................... H04L 67/12
(Continued)

FOREIGN PATENT DOCUMENTS

CN         102325306        1/2012
CN         105828299        8/2016
(Continued)

OTHER PUBLICATIONS

CN105828299 machine translation (Fang Jiyai), Aug. 3, 2016.\*
(Continued)

*Primary Examiner* — Anne Marie Antonucci
*Assistant Examiner* — Abdalla A Khaled
(74) *Attorney, Agent, or Firm* — Amin, Turocy & Watson, LLP (57) ABSTRACT

A vehicle information distributing method is provided, including: receiving a plurality of first vehicle information from a first base station to determine a first service area; receiving a plurality of second vehicle information from a second base station to determine a second service area; calculating a forwarding area based on a distance or an intersection between the first service area and the second service area; transferring the first vehicle information within the forwarding area to the second base station, and transferring the second vehicle information within the forwarding area to the first base station; and broadcasting, by the first base station, the second vehicle information from the forwarding area, and broadcasting, by the second base station, the first vehicle information from the forwarding area.

22 Claims, 7 Drawing Sheets

(56) References Cited

U.S. PATENT DOCUMENTS

| | | | |
|---|---|---|---|
| 2018/0124574 A1 | 5/2018 | Byun et al. | |
| 2020/0168086 A1* | 5/2020 | Rakshit | G08G 1/096822 |
| 2020/0213921 A1* | 7/2020 | Song | H04W 36/32 |

FOREIGN PATENT DOCUMENTS

| | | |
|---|---|---|
| CN | 106954184 | 7/2017 |
| CN | 107295470 | 10/2017 |
| CN | 107613533 | 1/2018 |
| EP | 2262188 B1 | 10/2012 |
| EP | 2262188 | 4/2017 |
| JP | 2018-147094 | 9/2018 |

OTHER PUBLICATIONS

Taiwanese Office Action for Taiwanese Patent Application No. 108101565 dated Apr. 9, 2020.

Desogus, et al. "Mobility Aware eMBMS Management in Urban 5G-Oriented Systems", 2017 IEEE International Symposium on Broadband Multimedia Systems and Broadcasting (BMSB); 2017; pp. 1-5.

Huang, et al. "A Dynamic Hybrid Counting Procedure for eMBMS of 3GPP", 2017 IEEE Wireless Communications and Networking Conference (WCNC); 2017; pp. 1-6.

Kaliski, et al. "Dynamic Resource Allocation Framework for MooD (MBMS Operation On-Demand)", IEEE Transactions on Broadcasting; 2016; vol. 62, Issue: 4, pp. 903-917.

Safiulin, et al. "Latency and Resource Utilization Analysis for V2X Communication over LTE MBSFN Transmission", WSA 2016; 20th International ITG Workshop on Smart Antennas; 2016; pp. 1-6.

Lentisco, et al. "Application level mechanisms for service continuity in an LTE multimedia broadcast service", 2015 IEEE International Symposium on Consumer Electronics (ISCE); 2015; pp. 1-2.

Kim "Adaptive handover scheme for evolved multimedia broadcast multicast services in long-term evolution networks", IET Communications; 2014, vol. 8, Issue: 16, pp. 2933-2942.

Monserrat, et al. "Joint Delivery of Unicast and E-MBMS Services in LTE Networks", IEEE Transactions on Broadcasting; 2012, vol. 58, Issue: 2, pp. 157-167.

Pandey, et al. "Improving Multicasting approach in UMTS network", 2014 International Conference on Green Computing Communication and Electrical Engineering (ICGCCEE); 2014, pp. 1-5.

Chinese Office Action for Chinese Patent Application No. 201910123930.9 dated Mar. 3, 2021.

* cited by examiner

VEHICLE INFORMATION DISTRIBUTING METHOD AND SYSTEM

CROSS-REFERENCE TO RELATED APPLICATIONS

This application claims priority to Taiwanese Application Serial No. 108101565, filed on Jan. 15, 2019. The entirety of the above-mentioned patent application is hereby incorporated by reference herein and made a part of this specification.

TECHNICAL FIELD

This disclosure relates to a vehicle information distributing method and a vehicle information distributing system applicable to vehicle-to-everything (V2X).

BACKGROUND

With the rapid development of self-driving technology, road safety is becoming an important issue. Communication equipment are installed between vehicles and roadside infrastructure or among vehicles so that drivers can share inter-vehicle messages with one another and determine the surrounding environment precisely. Therefore, as a dangerous event is going to happen, the drivers or vehicles can provide alarms to their nearby vehicles immediately, and collision can thus be avoided. Such communication between vehicles and facilities is called vehicle-to-everything (V2X) communication, which can be applied to self-driving or collision alarms.

V2X communication includes vehicle-to-vehicle (V2V), vehicle-to-infrastructure (V2I) and vehicle-to-pedestrian (V2P). These three V2X communication mechanisms share information among transmission equipment and provide instant safety alarms to drivers or vehicles. The transmission equipment can utilize the information transmitted by other vehicles, collect the information of their surroundings, and provide self-driving or collision alarms. In addition, the V2X communication architecture can use a PC5 interface or an LTE-Uu interface to share information.

In the V2X communication architecture in which the LTE-Uu interface is used to share information, a V2X application server (AS) has to receive basic safe message (BSM) packets transmitted from each user equipment (UE) via an up link (UL) and an evolved node (eNB, which can be used as a base station), and broadcasts the BSM packets via a down link (DL) of the eNB, to allow all UEs within a service area of the eNB or a specific range to receive the BSM packets. The specific range relates to a position where some events happened. For instance, as an accident happens somewhere in a road, the event of the accident has to be transmitted to all vehicles in the road, to allow them to make a detour to avoid a potential traffic jam.

Figure 1:
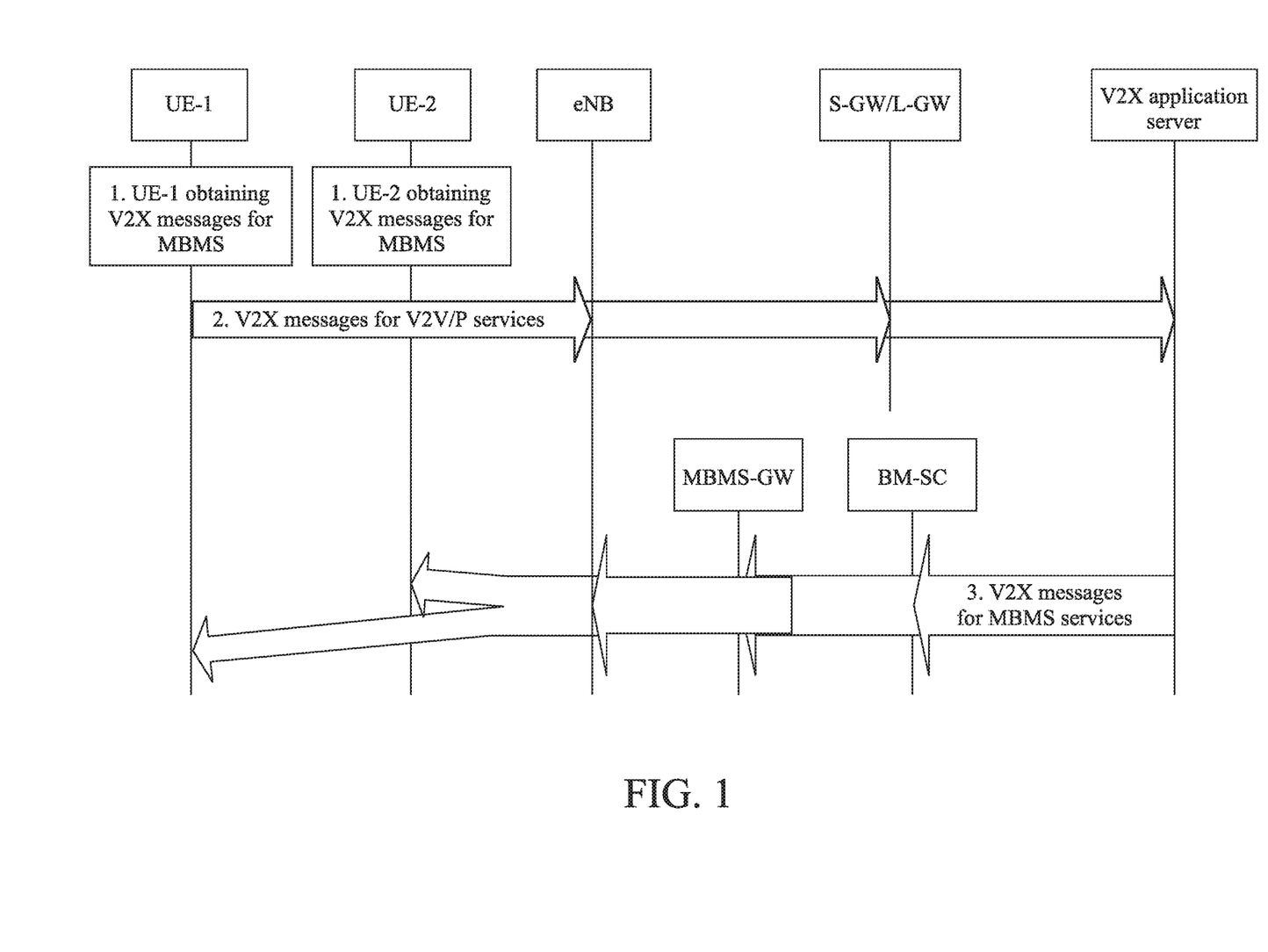
FIG. 1 is a schematic diagram of a multimedia broadcast multicast service (MBMS) of a long term revolution (LTE)

FIG. 1 is a schematic diagram of a system architecture of a multimedia broadcast multicast service (MBMS) of a long term revolution (LTE).

Please refer to FIG. 1. In the MBMS system, V2X messages of user equipment UE1 and UE2 are transmitted via an LTE-Uu interface up link to an eNB of an evolved universal terrestrial radio access network (E-UTRAN), and transmitted via a service gateway/local gateway (S-GW/L-GW) to a V2X application server (AS). Then, the V2X messages are transmitted to a multimedia broadcast multicast service gateway (MBMS-GW) based on the broadcast multicast service center (BM-SC) which is coupled to the AS, so that the V2X messages can be broadcasted via an eNB down link to all UEs (e.g., UE-1 and UE-2) within eNB's service area.

Figure 2:
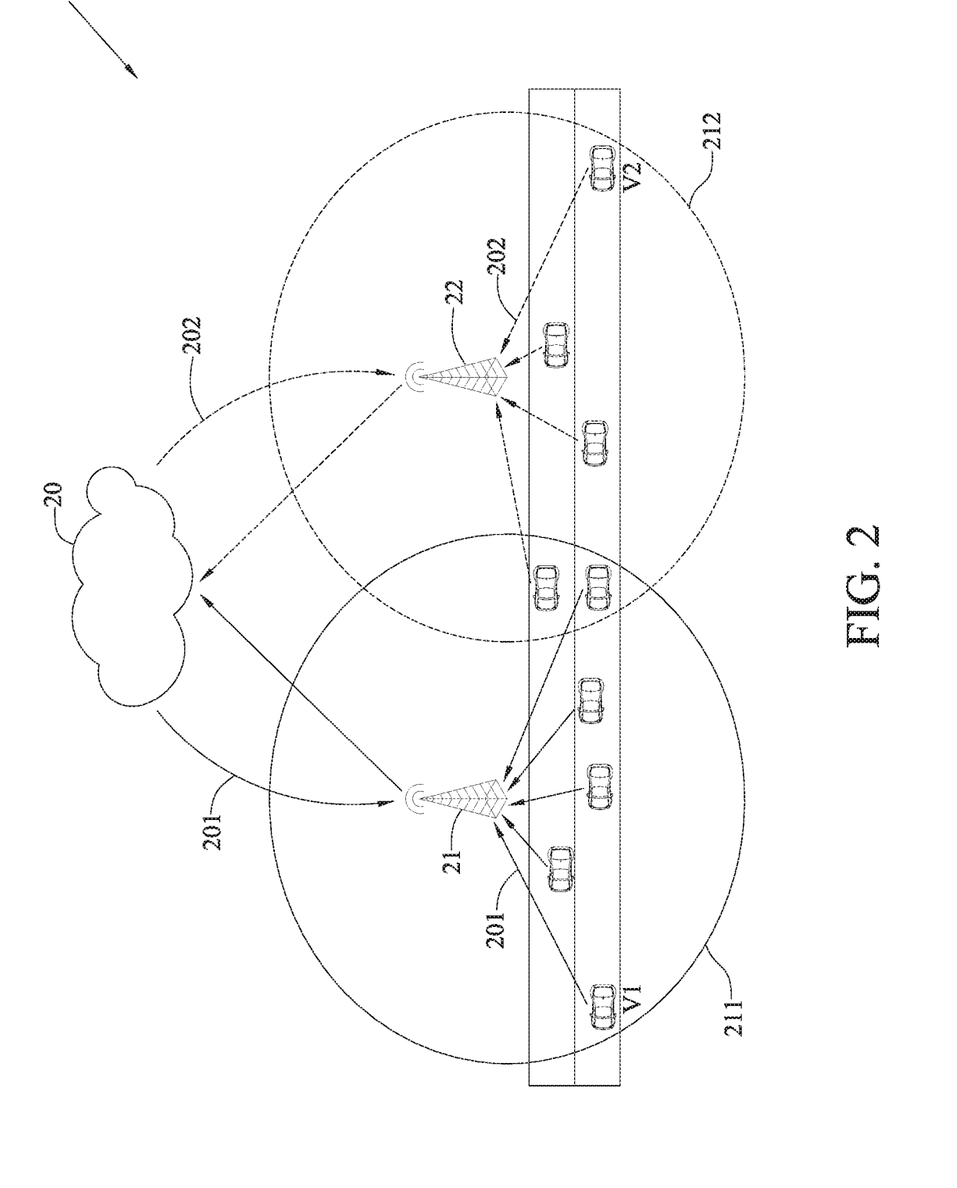
FIG. 2 is a schematic diagram of a vehicle information distributing system of V2X.

FIG. 2 is a schematic diagram of a vehicle information distributing system of the V2X.

As shown in FIG. 2, in the vehicle information distributing system of the V2X, a first service area 211 and a second service area 212 correspond to service areas of a first base station 21 and a second base station 22, respectively. V2X messages of UE(s) within the first service area 211 are uploaded via the first base station 21 to the AS control module 20, and the AS control module 20 broadcasts the V2X messages of the UE(s) received by the first base station 21. Therefore, all UEs within the first service area 211 may share their V2X messages with one another. Similarly, V2X messages of UE(s) within the second service area 212 are uploaded via the second base station 22 to the AS control module 20, and the AS control module 20 broadcasts all the V2X messages that the second base station 22 receives to all UE(s) within the second service area 212. Therefore, all the UEs within the second service area 212 may share their V2X messages with one another.

In the V2X system according to conventional technology, each UE can receive only the V2X messages of other UE(s) within the service area of the same base station, and cannot receive V2X messages within the service area of surrounding base stations. Therefore, the UE(s) within the first service area 211 of the first base station 21 can receive only the V2X messages of other UE(s) within the first service area 211, and cannot receive V2X messages of UE(s) within the second service area 212 of the second base station 22. As such, when the UE within the first service area 211 are close to the UE within the second service area 212, they cannot receive the V2X messages from each other for collision alarms, and an accident is likely to happen in such a scenario.

Therefore, how to overcome the issue that UEs within different service areas, when getting close to one another, cannot receive the V2X messages from one another is becoming an urgent issue in the art.

SUMMARY

This disclosure provides a vehicle information distributing method, comprising: receiving a plurality of first vehicle information from a first base station to determine a first service area; receiving a plurality of second vehicle information from a second base station to determine a second service area; calculating a forwarding area based on a distance or an intersection between the first service area and the second service area; transferring the first vehicle information within the forwarding area to the second base station, and transferring the second vehicle information within the forwarding area to the first base station; and broadcasting, by the first base station, the second vehicle information from the forwarding area, and broadcasting, by the second base station, the first vehicle information from the forwarding area.

This disclosure further provides a vehicle information distributing system, comprising: a first base station configured for receiving a plurality of first vehicle information to determine a first service area; a second base station configured for receiving a plurality of second vehicle information to determine a second service area; and an application server controlling module configured for receiving the first vehicle information and the second vehicle information and executing following steps of: calculating a forwarding area based on a distance or an intersection between the first service area and the second service area; transferring the first vehicle information within the forwarding area to the second base station, and transferring the second vehicle information within the forwarding area to the first base station; and broadcasting, by the first base station, the second vehicle information from the forwarding area, and broadcasting, by the second base station, the first vehicle information from the forwarding area.

In an embodiment, the aforementioned vehicle information distributing method and system further include the following steps of: determining whether the first service area and the second service area have an intersection; and when the first service area and the second service area do not have an intersection and the distance between the first service area and the second service area is less than or equal to a safety distance, taking a circle as the forwarding area, the circle having the safety distance as its diameter, and the distance between the first service area and the second service area as its center.

In an embodiment, further included are following steps of: determining whether the first service area and the second service area have an intersection; and when the first service area and the second service area have the intersection, calculating the forwarding area based on an intersecting area.

In an embodiment, calculating the forwarding area based on the intersecting area comprises when only a portion of the intersecting area is within the first service area and the second service area, taking a center of two intersecting points of the first service area and the second service area as a center of a circle, and taking the circle as the forwarding area, the circle having a safety distance added by a distance between the center and one of the two intersecting points as its radius.

In an embodiment, calculating the forwarding area based on the intersecting area comprises when the intersecting area is within the first service area or the second service area entirely, taking a circle as the forwarding area, the circle having the radius of the smaller one of the first service area and the second service area added by a safety distance as its radius.

In an embodiment, the safety distance indicates a minimum distance between two vehicles in compliance with each application field standard.

In an embodiment, the safety distance is a distance calculated based on a response time and a driving speed.

It is known from the above that in a vehicle information distributing method and a vehicle information distributing system according to this disclosure, which can provide services to more than one service areas, vehicle information of different vehicles can be transmitted to each other as they get close to each other, even if they are not within the same service area. Therefore, the drawback of the prior art that vehicles within different service areas cannot transmit V2X messages to each other even if they are getting close to each other is overcome.

BRIEF DESCRIPTION OF DRAWINGS

The disclosure can be more fully understood by reading the following detailed description of the embodiments, with reference made to the accompanying drawings, wherein.

DETAILED DESCRIPTION OF DISCLOSED EMBODIMENTS

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements).

Figure 3:
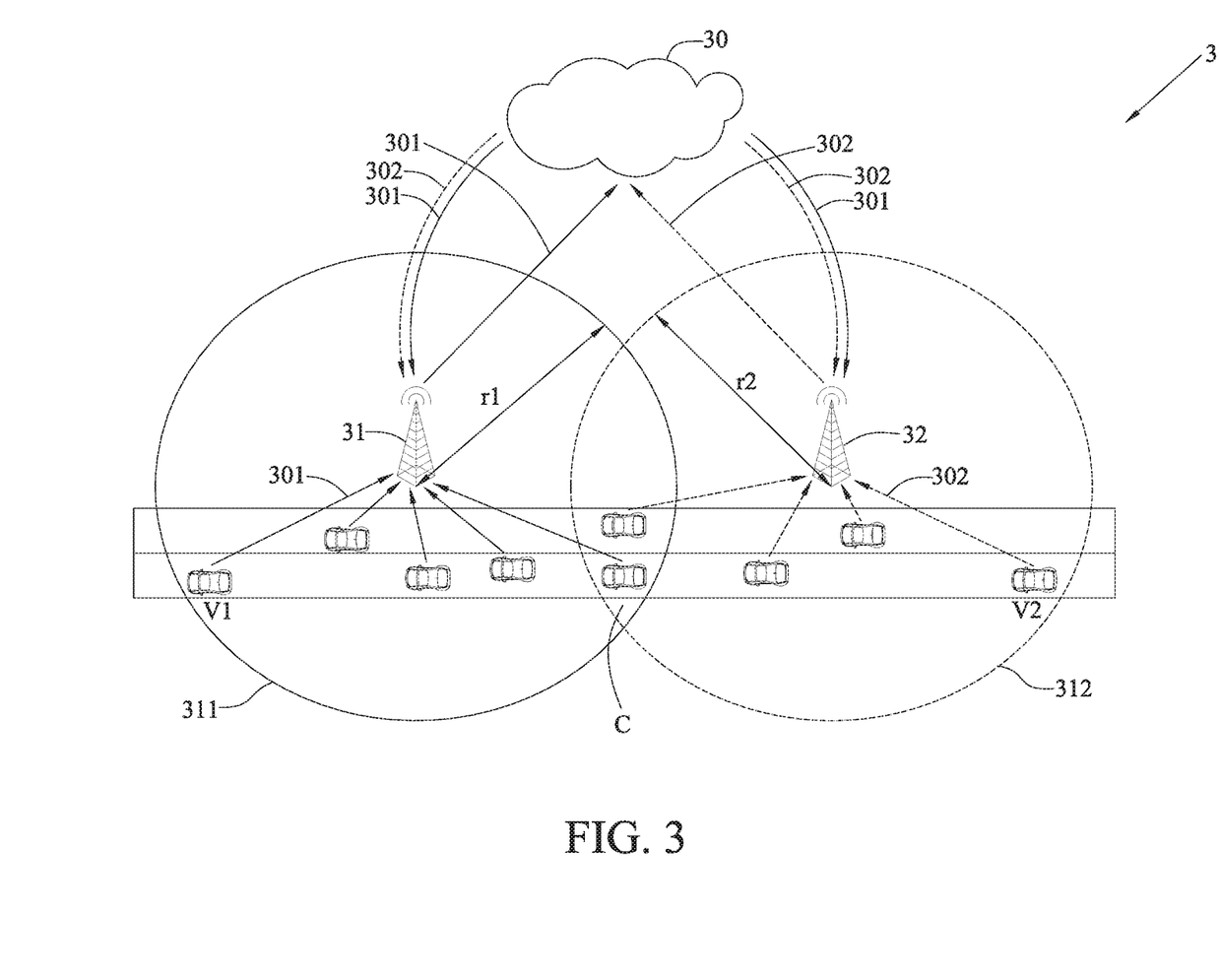
FIG. 3 is a schematic diagram of a vehicle information distributing system of an embodiment according to this disclosure, which can provide services to more than one service area.

FIG. 3 is a schematic diagram of a vehicle information distributing system of an embodiment according to this disclosure, which can provide services to more than one service area.

As shown in FIG. 3, the vehicle information distributing system 3 comprises a first base station 31, a second base station 32 and an AS control module 30. The first base station 31 receives and uploads a plurality of first vehicle information 301 to the AS control module 30. The second base station 32 receives and uploads a plurality of second vehicle information 302 to the AS control module 30. The AS control module 30 performs subsequent operations based on the plurality of first vehicle information 301 and the plurality of second vehicle information 302.

Moreover, in the vehicle information distributing system 3 according to the embodiment, the first base station 31 and the second base station 32 have their own service areas, i.e., a first service area 311 and a second service area 312, respectively. The first service area 311 is determined by the plurality of first vehicle information 301 that the first base station 31 receives, and the second service area 312 is determined by the plurality of second vehicle information 302 that the second base station 32 receives.

In an embodiment, the first vehicle information 301 and the second vehicle information 302 are basic safe message (BSM) packets periodically broadcast by vehicles, such as cars, electronic devices and mobile devices, and each of the BSM packets of the carriers comprises a variety of information, such as ID, longitude and latitude, velocity and direction of the carriers. After receiving the BSM packets of the carriers, the first base station 31 and the second base station 32 upload the BSM packets of the vehicles to the AS control module 30. In an embodiment, the AS control module 30 is an application server of an MBMS system. The AS control module 30 calculates the coverage of the first service area 311 and the second service area 312 based on the BSM packets that the first base station 31 and the second base station 32 received, respectively. In an embodiment, after receiving a plurality of BSM packets uploaded via the first base station 31 from all vehicles, the AS control module 30 finds out the farthest one of the vehicles from the first base station 31, i.e., a vehicles V1, based on the longitude and latitude messages in the BSM packets, and calculates the coverage of the first service area 311 based on the distance between the first base station 31 and the vehicles V1 (i.e., a radius r1). As shown in FIG. 3, the AS control module 30 takes the longitudes of the vehicles V1 and the first base station 31 as X-coordinates, takes the latitudes of the vehicles V1 and the first base station 31 as Y-coordinates, calculates a difference between the two coordinates, and calculates the distance (i.e., the radius r1) between the vehicles V1 and the first base station 31. The coverage of the first service area 311 is represented by a circle having the first base station 31 as its center and r1 as its radius. Similarly, the AS control module 30 can also calculates the coverage of the second service area 312, which takes the second base station 32 as a center of a circle and r2 as a radius of the circle.

It should be noted that although comprising two service areas 311 and 312, the vehicle information distributing system 3 is provided here as an example only. According to this exemplary embodiment, a vehicle information distributing system 3 can comprise more than two service areas, and each of the service areas may be a small service area covered by a single base station or a large service area covered by a plurality of base stations. For simple illustration, in the following paragraphs only a service area covered by a single base station is exemplified.

The AS control module 30 determines whether to calculate a forwarding area C based on a distance or an intersection between the first service area 311 and the second service area 312. After determining the forwarding area C, the AS control module 30 transmits the first vehicle information 301 within the forwarding area C to the second base station 32, and transmits the second vehicle information 302 within the forwarding area C to the first base station 31, allowing the second vehicle information 302 within the forwarding area C to be broadcasted from the first base station 31 and the first vehicle information 301 within the forwarding area C to be broadcasted from the second base station 32. In other words, the first base station 31 broadcasts the second vehicle information 302 from the forwarding area C, and second base station 32 broadcasts the first vehicle information 301 from the forwarding area C. Therefore, vehicles, such as cars, electronic devices, mobile devices etc., disposed within the forwarding area C but belonging to different service areas provided by different base stations, can still share a vehicle information of the different service areas with one another.

Figure 4:
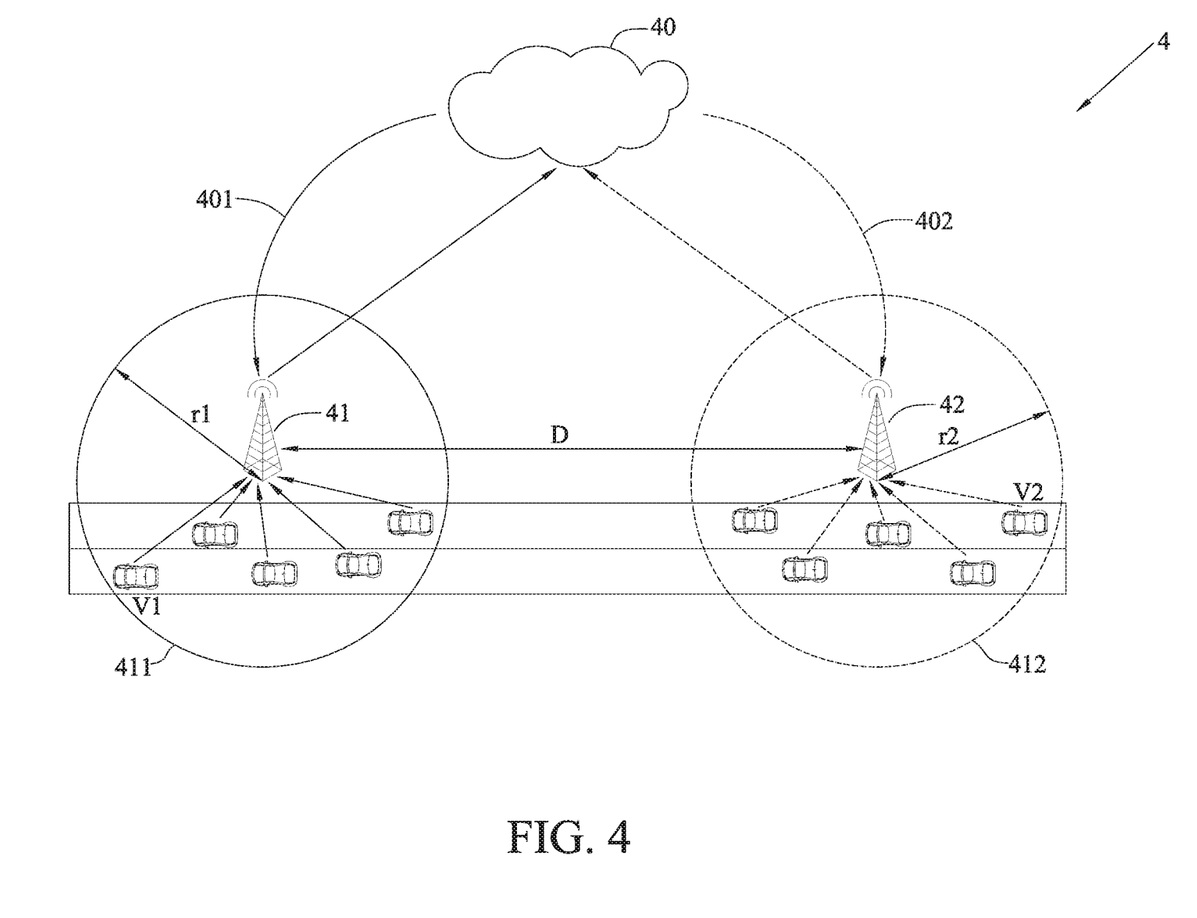
FIG. 4 is a schematic diagram of a vehicle information distributing system of a first embodiment according to this disclosure, which can provide services to more than one service area.

FIG. 4 is a schematic diagram of a vehicle information distributing system of a first embodiment according to this disclosure, which can provide services to more than one service area.

Please refer to FIG. 4. When the AS control module 40 determines that the first service area 411 and the second service area 412 are not intersected and the distance between the first service area 411 and the second service area 412 is greater than a safety distance $d_{safe}$, e.g., D−(r1+r2)>$d_{safe}$ based on the position (x1, y1) of the first base station 41, the position (x2, y2) of the second base station 42, the distance D between the first base station 41 and the second base station 42, the radius r1 of the first service area 411 and the radius r2 of the second service area 412. Since vehicles within the coverage of the first service area 411 and vehicles within the coverage of the second service area 412 are spaced apart far enough from each other, the vehicle information within the two service areas need not be forwarded. Therefore, the AS control module 40 need not to calculate the forwarding area C. The safety distance $d_{safe}$ is determined by the AS control module 40 based on a variety of factors, such as application type, road conditions etc. According to society of automotive engineers (SAE) international levels of automation of on-road vehicles, L3 defines a response time of automation of on-road vehicles is 10 seconds. If the speed limits in downtown, suburban and highway are assumed to be 100 km/hr, 200 km/hr and 250 km/hr, respectively, the safety distance $d_{safe}$ for the downtown, suburban and highway are 278 m, 556 m and 694 m, respectively. In another application type, for example, when an accident happens on a road, vehicles two to three kilometers away from the accident may have been affected. In order for these vehicles to make a detour in advance, the AS control module 40 may determine a greater safety distance $d_{safe}$, e.g., 3 km, based on this scenario, to notify the vehicles several kilometers away from the accident to make a detour in order to avoid traffic jam.

Figure 5:
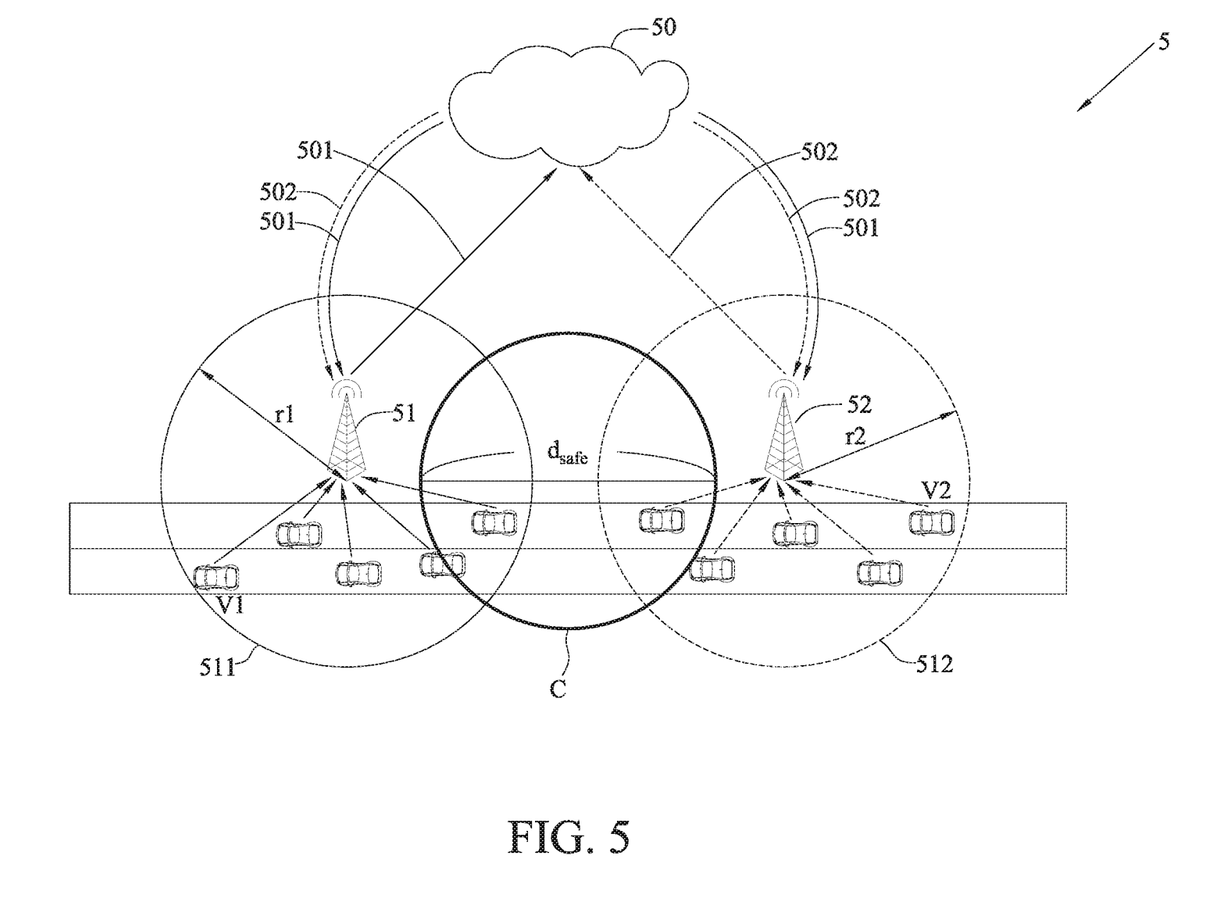
FIG. 5 is a schematic diagram of a vehicle information distributing system of a second embodiment according to this disclosure, which can provide services to more than one service area.

FIG. 5 is a schematic diagram of a vehicle information distributing system of a second embodiment according to this disclosure, which can provide services to more than one service area.

Please refer to FIG. 5. When determining that the first service area 511 and the second service area 512, though having no intersection, are very close to each other, e.g., 0<(r1+r2)≤$d_{safe}$, that is vehicles neighboring the boundary of the first service area 511 and the second service area 512 being very close to one another, based on the position (x1, y1) of the first base station 51, the position (x2, y2) of the second base station 52, the distance D between the first base station 51 and the second base station 52 and the radius r1 of the first service area 511 and the radius r2 of the second service area 512, the AS control module 50 calculates a forwarding area C, to transmit the first vehicle information 501 within the forwarding area C to the second base station 52 and transmit the second vehicle information 502 within the forwarding area C to the first base station 51. Therefore, the second vehicle information 502 and the first vehicle information 501 within the forwarding area C can be broadcasted by the first base station 51 and the second base station 52, respectively.

Specifically, as shown in FIG. 5, the AS control module 50 takes a center of the distance D between the first base station 51 and the second base station 52 subtracted by the radius r1 of the first service area 511 and the radius r2 of the second service area 512 (i.e., D−(r1+r2)) as a center of a circle, takes a safety distance $d_{safe}$ as a diameter of the circle, and calculates a circular area as the forwarding area C, in order to transmit the first vehicle information 501 within the forwarding area C to the second base station 52 and transmit the second vehicle information 502 within the forwarding area C to the first base station 51. The first base station 51 and the second base station 52 broadcast the second vehicle information 502 and the first vehicle information 501 within the forwarding area C, respectively. Therefore, vehicles, when approaching the coverage of the first service area 511 and the second service area 512, the vehicles can receive vehicle information (e.g., BSM) from one another, to increase driving safety.

Figure 6:
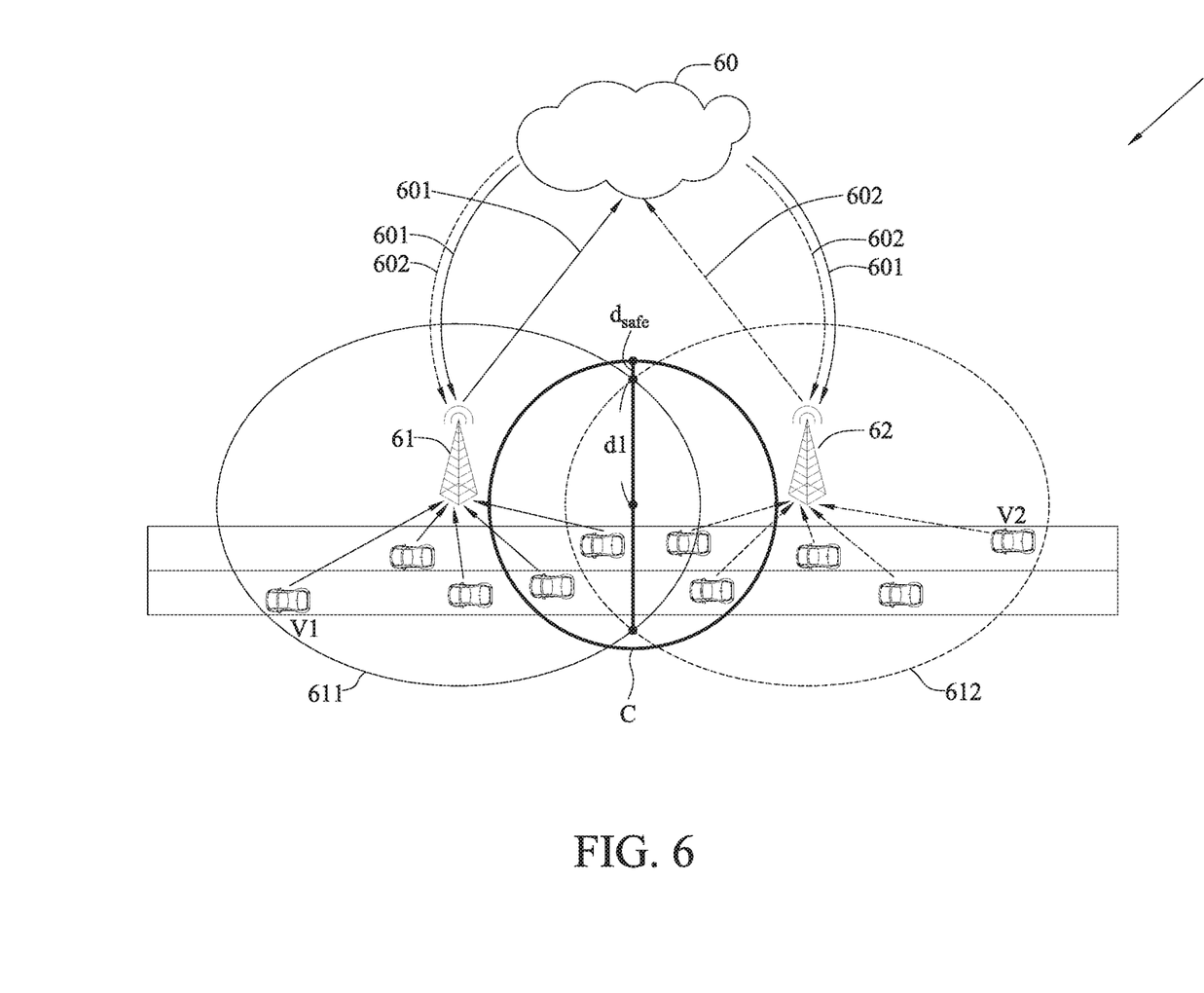
FIG. 6 is a schematic diagram of a vehicle information distributing system of a third embodiment according to this disclosure, which can provide services to more than one service area.

FIG. 6 is a schematic diagram of a vehicle information distributing system of a third embodiment according to this disclosure, which can provide services to more than one service area.

Please refer to FIG. 6. When determining that the first service area 611 and the second service area 612 have an intersection, i.e., D−(r1+r2)<0, based on the position (x1, y1) of the first base station 61, the position (x2, y2) of the second base station 62, the distance D between the first base station 61 and the second base station 62 and the radius r1 of the first service area 611 and the radius r2 of the second service area 612, the AS control module 60 calculates a forwarding area C to transmit the first vehicle information 601 within the forwarding area C to the second base station 62 and transmit the second vehicle information 602 within the forwarding area C to the first base station 61. Therefore, the first base station 61 and the second base station 62 broadcast the second vehicle information 602 and the first vehicle information 601 within the forwarding area C, respectively.

As shown in FIG. 6, the AS control module 60 calculates two intersecting points of the first service area 611 and the second service area 612, takes a center of the two intersecting points as a center of a circle of the forwarding area C, and takes a half of a distance d1 between the two intersecting points added by the safety distance $d_{safe}$ as the radius d of the forwarding area C, i.e., $d=d1+d_{safe}$, to calculate the radius d of the forwarding area C. Therefore, the first vehicle information 601 within the forwarding area C can be transmitted to the second base station 62, and the second vehicle information 602 within the forwarding area C can be transmitted to the first base station 61. The first base station 61 and the second base station 62 broadcast the second vehicle information 602 and the first vehicle information 601 within the forwarding area C, respectively. When the first service area 611 and the second service area 612 are intersected, vehicles within the forwarding area C, though belonging to different service areas, can still share vehicle information with one another.

Figure 7:
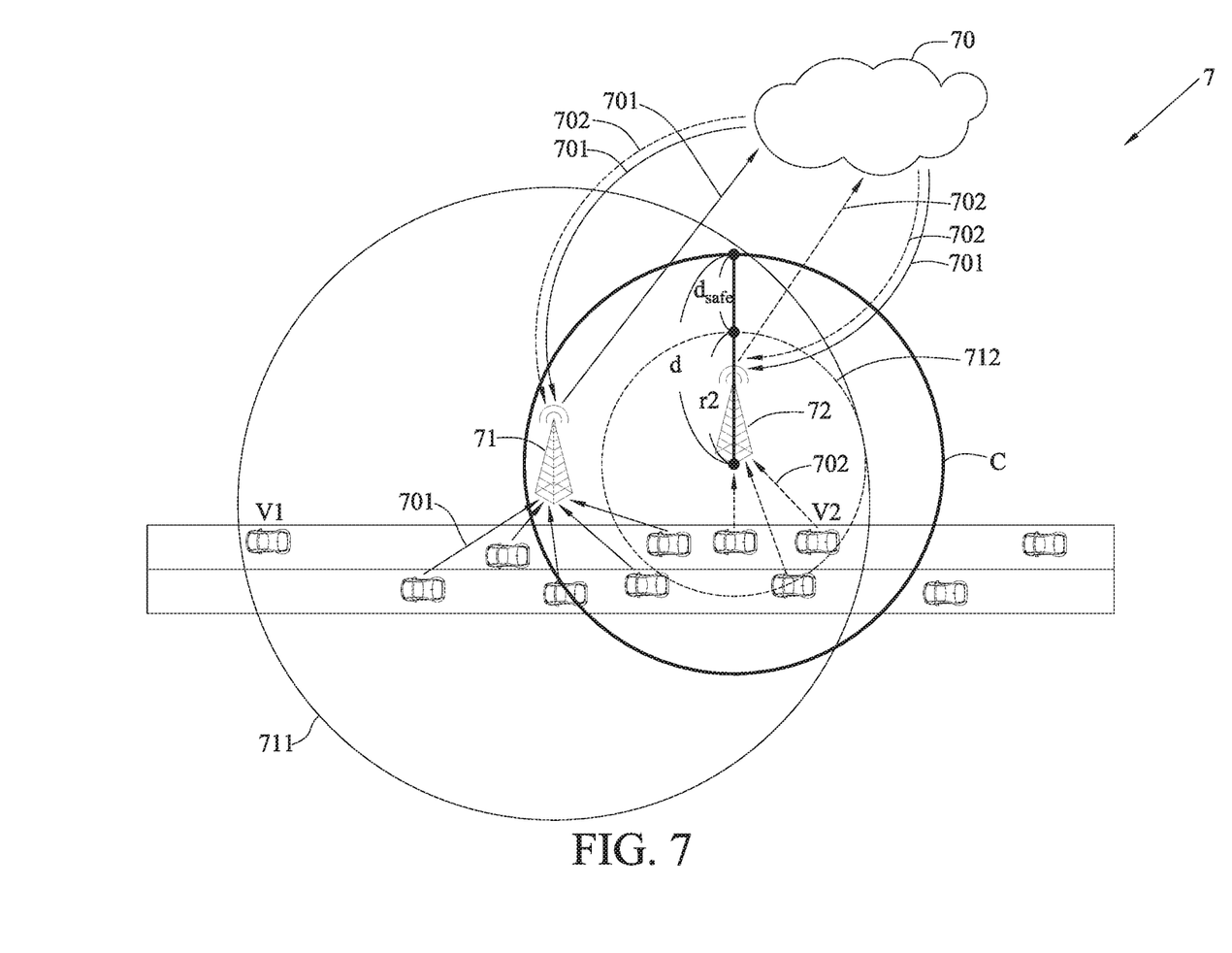
FIG. 7 is a schematic diagram of a vehicle information distributing system of a fourth embodiment according to this disclosure, which can provide services to more than one service area.

FIG. 7 is a schematic diagram of a vehicle information distributing system of a fourth embodiment according to this disclosure, which can provide services to more than one service area.

Please refer to FIG. 7. When determining that one of the first service area 711 and the second service area 712 falls within the other entirely based on the position of (x1, y1) of the first base station 71, the position (x2, y2) of the second base station 72, the distance D between the first base station 71 and the second base station 72 and the radius r1 of the first service area 711 and the radius r2 of the second service area 712, the AS control module 70 calculates the forwarding area C based on the radius and the safety distance $d_{safe}$ of the smaller coverage.

Specifically, as shown in FIG. 7, when determining that the second service area 712, which has a smaller coverage, falls within the first service area 711 entirely, which has a greater coverage, the AS control module 70 takes the position (x2, y2) of the second base station 72 as a center of a circle, takes the radius r2 of the second service area 712 added by the safety distance $d_{safe}$, i.e., $d=r2+d_{safe}$, as the radius d of the circle, and takes the circle as forwarding area C, to transmit the first vehicle information 701 within the forwarding area C to the second base station 72 and transmit the second vehicle information 702 within the forwarding area C to the first base station 71. The first base station 71 and the second base station 72 broadcast the second vehicle information 702 and the first vehicle information 701 within the forwarding area C, respectively. Therefore, vehicles within the forwarding area C, even belonging to difference service areas, can still share vehicle information with one another.

In view of the aforementioned descriptions, a vehicle information distributing method and a vehicle information distributing system according to this disclosure can forward vehicle information of vehicles within difference service areas running close to one another. Therefore, the issue that vehicles belonging to different service areas will not receive V2X messages from one another even if they are very close to one another can be overcome.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A vehicle information distributing method, comprising:
   receiving a plurality of first vehicle information from a first base station to determine a first service area of the first base station;
   receiving a plurality of second vehicle information from a second base station to determine a second service area of the second base station;
   determining whether the first service area of the first base station and the second service area of the second base station have an intersection to calculate a forwarding area based on the intersection between the first service area and the second service area;
   transferring the first vehicle information within the forwarding area to the second base station, and transferring the second vehicle information within the forwarding area to the first base station; and
   broadcasting, by the first base station, the second vehicle information from the forwarding area, and broadcasting, by the second base station, the first vehicle information from the forwarding area.

2. The vehicle information distributing method of claim 1, further comprising:
   when the first service area and the second service area do not have the intersection and the distance between the first base station and the second base station subtracted by a radius of the first service area and a radius of the second service area is less than or equal to a safety distance, taking a circle as the forwarding area, the circle having the safety distance as its diameter, and the distance between the first base station and the second base station subtracted by the radius of the first service area and the radius of the second service area as its center.

3. The vehicle information distributing method of claim 2, wherein the safety distance indicates a minimum distance between two vehicles in compliance with each application field standard.

4. The vehicle information distributing method of claim 3, wherein the safety distance is a distance calculated based on a response time and a driving speed.

5. The vehicle information distributing method of claim 1, further comprising:
when the first service area and the second service area have the intersection, calculating the forwarding area based on an intersecting area.

6. The vehicle information distributing method of claim 5, wherein calculating the forwarding area based on the intersecting area comprises, when only a portion of the intersecting area is within the first service area and the second service area, taking a center of two intersecting points of the first service area and the second service area as a center of a circle, and taking the circle as the forwarding area, the circle having a safety distance added by a distance between the center and one of the two intersecting points as its radius.

7. The vehicle information distributing method of claim 6, wherein the safety distance indicates a minimum distance between two vehicles in compliance with each application field standard.

8. The vehicle information distributing method of claim 7, wherein the safety distance is a distance calculated based on a response time and a driving speed.

9. The vehicle information distributing method of claim 5, wherein calculating the forwarding area based on the intersecting area comprises, when the intersecting area is within the first service area or the second service area entirely, taking a circle as the forwarding area, wherein a radius of the circle is formed by a smaller radius of the first service area or the second service area added by a safety distance.

10. The vehicle information distributing method of claim 9, wherein the safety distance indicates a minimum distance between two vehicles in compliance with each application field standard.

11. The vehicle information distributing method of claim 10, wherein the safety distance is a distance calculated based on a response time and a driving speed.

12. A vehicle information distributing system, comprising:
a first base station configured for receiving a plurality of first vehicle information to determine a first service area of the first base station;
a second base station configured for receiving a plurality of second vehicle information to determine a second service area of the second base station; and
an application server controlling module configured for receiving the first vehicle information and the second vehicle information and executing following steps of:
determining whether the first service area of the first base station and the second service area of the second base station have an intersection to calculate a forwarding area based on the intersection between the first service area and the second service area;
transferring the first vehicle information within the forwarding area to the second base station, and transferring the second vehicle information within the forwarding area to the first base station; and
broadcasting, by the first base station, the second vehicle information from the forwarding area, and broadcasting, by the second base station, the first vehicle information from the forwarding area.

13. The vehicle information distributing system of claim 12, wherein the application server controlling module further executes following steps of:
when the first service area and the second service area do not have the intersection and the distance between the first service area and the second service area is less than or equal to a safety distance, taking a circle as the forwarding area, the circle having the safety distance as its diameter, and the distance between the first service area and the second service area as its center.

14. The vehicle information distributing system of claim 13, wherein the safety distance indicates a minimum distance between two vehicles in compliance with each application field standard.

15. The vehicle information distributing system of claim 14, wherein the safety distance is a distance calculated based on a response time and a driving speed.

16. The vehicle information distributing system of claim 12, wherein the application server controlling module further executes following steps of:
when the first service area and the second service area have the intersection, calculating the forwarding area based on an intersecting area.

17. The vehicle information distributing system of claim 16, wherein calculating the forwarding area based on the intersecting area comprises, when only a portion of the intersecting area is within the first service area and the second service area, taking a center of two intersecting points of the first service area and the second service area as a center of a circle, and taking the circle as the forwarding area, the circle having a safety distance added by a distance between the center and one of the two intersecting points as its radius.

18. The vehicle information distributing system of claim 17, wherein the safety distance indicates a minimum distance between two vehicles in compliance with each application field standard.

19. The vehicle information distributing system of claim 18, wherein the safety distance is a distance calculated based on a response time and a driving speed.

20. The vehicle information distributing system of claim 16, wherein calculating the forwarding area based on the intersecting area comprises, when the intersecting area is within the first service area or the second service area entirely, taking a circle as the forwarding area, wherein a radius of the circle is formed by a smaller radius of the first service area or the second service area added by a safety distance.

21. The vehicle information distributing system of claim 20, wherein the safety distance indicates a minimum distance between two vehicles in compliance with each application field standard.

22. The vehicle information distributing system of claim 21, wherein the safety distance is a distance calculated based on a response time and a driving speed.

* * * * *